US006965673B1

(12) United States Patent
Boneh et al.

(10) Patent No.: US 6,965,673 B1
(45) Date of Patent: Nov. 15, 2005

(54) METHOD OF USING TRANSIENT FAULTS TO VERIFY THE SECURITY OF A CRYPTOSYSTEM

(75) Inventors: Dan Boneh, Palo Alto, CA (US); Richard Lipton, Lawrenceville, NJ (US); Richard A. DeMillo, Morristown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 09/516,910

(22) Filed: Mar. 1, 2000

Related U.S. Application Data

(63) Continuation of application No. 08/933,541, filed on Sep. 19, 1997.

(51) Int. Cl.[7] ................................................ H04K 1/00
(52) U.S. Cl. .............................. 380/28; 380/1; 380/286
(58) Field of Search ............................. 380/1, 286, 28, 380/2

(56) References Cited

U.S. PATENT DOCUMENTS 5,991,415 A * 11/1999 Shamir ........................ 380/30

OTHER PUBLICATIONS

Further results on Chinese remaindering, Joye et al. Technical Report Jan. 1997 http://www.dice.ucl.ac.be/crypto/.*
Attacks on systems using Chinese remaindering, Joye et al. Technical Report Sep. 1996 http://www.dice,ucl.ac.be/crypto/.*

How to break completely unknown cryptosystme, El Biham et al. Oct. 1996, Internet article "http://www.informatik.uni-mannheim.de".*

6.5857 Computer & Network Security Final Project: Differential Fault Analysis, Dec. 19, 1996.*

* cited by examiner

*Primary Examiner*—Kim Vu
*Assistant Examiner*—Beemnet W. Dada
(74) *Attorney, Agent, or Firm*—William A. Schoneman; Joseph Giordano

(57) ABSTRACT

A useful method of verifying the integrity of a cryptosystem involves using erroneous outputs to obtain secret information. In certain signature schemes which use the Chinese Remainder Theorem, a correct signature of a message and an erroneous signature of the same message permit the modulus to be easily obtained. If the content of the message is known, such cryptosystems may be cracked with only an erroneous signature of the message. Certain other authorization schemes may be cracked by analyzing a number of erroneous outputs caused by a particular type of error called a "register fault." A security expert or cryptosystem designer may intentionally induce a tamper proof device generate a faulty computation by subjecting the device, such as a smart card, to physical stress, such as certain types of radiation, atypical voltage levels, or a higher clock rate than the device was designed to accommodate. Cryptosystems should be impervious to the attacks described herein. If not, the system should be modified or discarded.

13 Claims, 7 Drawing Sheets

FIG. 5B

| STEP | PARTY i | PARTY j |
|---|---|---|
| (6) | | PARTY j MAY USE r TO DETERMINE $\Pi_{i \in S} s_i$ USING: $$\Pi_{i \in S} s_i = \frac{2\hat{\varepsilon}\hat{y}}{\frac{\hat{y}^2}{\Pi_{i \in S} v_i} - r^2 + \hat{\varepsilon}^2} \pmod{N}$$ |
| (7) | | PARTY j's CRYPTOGRAPHY DEVICE DETERMINES $\Pi_{i \in S} s_i$ FOR VARIOUS SETS $U_j$ CONSTRUCTED AS EITHER (1) SINGLETON SETS OR (2) SELECTED AT RANDOM SUCH THAT RESULTING CHARACTERISTIC VECTORS ARE LINEARLY INDEPENDENT |
| (8) | | USING THE SETS CONSTRUCTED ABOVE, PARTY j's DEVICE PERFORMS THE FIAT-SHAMIR AUTHENTICATION SCHEME, PROVIDING THE SETS TO PARTY i's DEVICE |
| (9) | | USING THE RESPONSE TO THE SETS SENT TO PARTY i's DEVICE, PARTY j DETERMINES THE SECRET VALUES $s_1, \ldots, s_t$. |

FIG. 6A
(PRIOR ART)
FIG. 6B
(PRIOR ART)
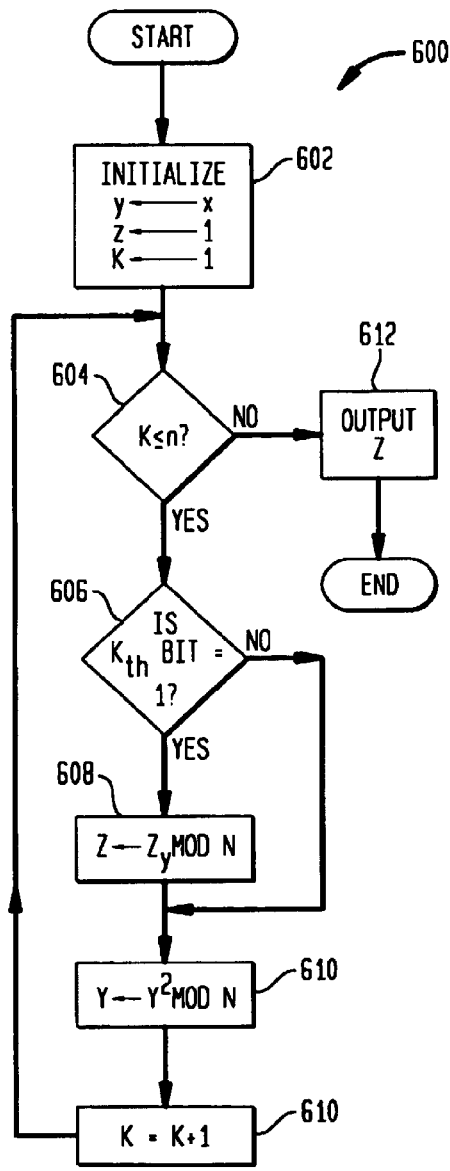
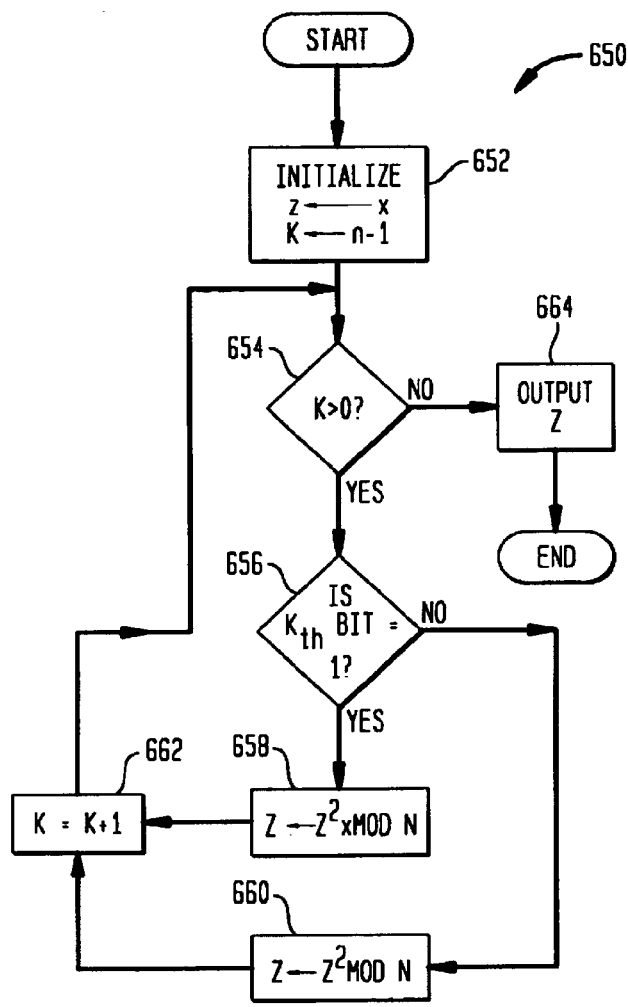

METHOD OF USING TRANSIENT FAULTS TO VERIFY THE SECURITY OF A CRYPTOSYSTEM

RELATED APPLICATION

This patent application is a continuation of U.S. patent application Ser. No. 08/933,541 filed Sep. 19, 1997.

BACKGROUND OF THE INVENTION

1. Field of the Invention

The present invention relates to cryptanalysis and, more particularly, relates to methods for "cracking", or deciphering, cryptosystems, by analyzing one or more erroneous outputs to infer information ordinarily difficult or impossible for a party not privy to secret information. Knowing how a cryptosystem may be cracked suggests methods for avoiding attacks on the cryptosystem, thus further improving the integrity of the cryptosystem. A security expert or cryptosystem designer may use the inventive methods in the design of cryptography devices to verify that an existing or proposed device is impervious to such attacks.

2. Discussion of Related Art

Cryptography has become essential to the acceptance of electronic commerce and sensitive electronic communications. For example, secure digital signatures and verification methods provide high assurance that a party is who it represents itself to be. This assurance is vital to the general acceptance of, for example, commerce over the Internet, the use of electronic money, cellular communications, and remote computer login procedures. Typically, certain well-known cryptographic methods are used to encrypt information in a manner that is very difficult to decrypt without certain secret information, thus making these signatures and verifications secure. One type of cryptographic method which is commonly used is public key cryptography.

1. Public Key Cryptography

In a typical public key cryptographic system, each party i has a public key (or exponent) $P_i$ and a secret key (or exponent) $S_i$. The public key $P_i$, is known to everyone, but the secret key $S_i$ is known only to party i. A plain text message m to user i is encrypted to form the cipher text message x using a public operation P which makes use of the public key $P_i$ known to everyone, i.e., $x=P(m,P_i)$. The cipher text message x is decrypted using a secret operation S which makes use of the secret key $S_i$, i.e., $m=S(x,S_i)$. Only party i who has the secret key $S_i$ can perform the secret operation to decrypt the encrypted message x to obtain clear text message m.

Public key cryptographic techniques may be used for authentication. Authentication is a (theoretically) fool-proof technique for a party to verify that a party contacting it is the party is asserts to be. For example, a confidential network may require that a party authenticate itself before gaining access to the network.

If it is true that $P(S(x,S_i),P_i)=x$ (recall the $S(x,S_i)=m$, resulting in $P(m,P_i)=x$), then the owner of the corresponding keys $P_i$, $S_i$ could sign message m by producing $E=S(m,S_i)$, where E indicates the signature. The verifier, given x and E, will verify $x=P(E,P_i)$. One type of a cryptography system could be used for verification as follows: challenge the party claiming to be i with message x and ask the party to sign the message x using his secret key $S_i$, then verify the signature using $P_i$. More efficient and secure authentication protocols may be used, such as the Fiat-Shamir and Schnorr protocols discussed below.

FIG. 1A is a block diagram of a typical cryptography device 100. The device 100 has a processor 102 including one or more CPUs 102, a main memory 104, a disk memory 106, an input/output device 108, and a network interface 110. The devices 102–110 are connected to a bus 120 which transfers data, i.e., instructions and information between each of these devices 102–110.

FIG. 1B illustrates a network 150 over which cryptography devices 100 may communicate. Two or more cryptography devices 100, 100' may be connected to a communications network 152, such as a wide area network; which may be the Internet, a telephone network, or leased lines; or a local area network. Each device 100 may include a modem 154 or other network communication device to send encrypted messages over the communications network 152. A cryptography device 100 may be a gateway to a sub-network 156. That is, the device 100 may be an interface between a wide area network 152 and a local area (sub) network 156.

An example of a public key cryptographic technique which may be performed by the device 100 is the well known RSA technique. In accordance with this technique, a party i has stored in memory 104 or 106 its own public key (or exponent) $e_i$ and modulus N (where N is a product of two large prime numbers p,q) and a secret key in the form of an exponent $s_i$. It has stored or otherwise obtained the public key e; of a party to which it wishes to send a message. The party may have a plain text message m which it wishes to send to party j without others knowing the content of m. The device 100 encrypts the message m to form $x=me_i$ mod N using processor 102 and perhaps software stored in main memory 104. Party j's device can then decrypt x to obtain m by performing the operation $m=X^{s_j}$ mod N.

Another public key cryptographic technique is the Rabin modular square root. In this technique, the secret operation involves obtaining a modular square root and the public operation involves a modular squaring operation.

Rabin's Signature Scheme is similar to the RSA signature system and relies on the difficulty of factoring for its security. As above, assume N=pq is a product of two large prime numbers p,q. To sign a document D, party i's device 100 first hashes D to a number D' between 1 and N. The signer's device 100, which knows the secret factorization of the modulo N, computes the square root of D' (mod N) using the processor 102. Thus, the signature E is:

$$E=\sqrt{D'}(\bmod N) \qquad (1)$$

Without knowing the factorization of N, computing the modular square root of a number is difficult.

The Fiat-Shamir authentication scheme is a cryptosystem for a first party to authenticate its identity to another party. This is done as follows: party i's cryptography device 100 and party j's cryptography device 100' (as seen in FIG. 1B) agree on an n-bit modulus N=pq, where p and q are each a large prime number. Party i's secret keys are a set of invertible elements (i.e., bits) $s_1, \ldots, s_t$ (mod N) stored in the memory 104 or 106 of its cryptography device 100. Party i's public key is the square of these invertible elements (bits) $v_1=s_1^2, \ldots, v_t=s_t^2$ (mod N). Party i authenticates itself to party j using the following protocol:

1. Party i's cryptography device selects a random r, generates $r^2$ mod N, and transmits this value to party j's cryptography device.
2. Party j's cryptography device selects a random subset $S \subseteq (1, \ldots, t)$, and transmits the subset to party i via an I/O.

3. Party i's cryptography device computes $y=\Pi_{i \in s}s_i$ mod N and transmits y to party j.

4. Party j's device verifies party i's identity by checking that $y^2=r^2\Pi_{j \in s}v_j$(mod N).

The Schnorr authentication scheme is another cryptosystem for a first party to authentic its identity to a second party. The security of the Schnorr authentication scheme is based on the difficulty of computing discrete log modulo a prime. In Schnorr's authentication scheme, party i and party j agree on a prime number p and a generator g of $Z_p^+$. where $Z_p^+$ is group of integers modulo p and relatively prime to p. Party i chooses a secret integer $s_i$ and publishes $y_i=g^{si}$ mod p as party i's public key. Party i authenticates itself to party j by engaging in the following protocol:

1. Party i's cryptography device selects a random integer r ∈[0,p] and sends $z=g^r$ mod p to party j's cryptography device via an I/O 210.

2. Party j's cryptography device selects a random integer t∈[0, T] and sends t to party i via an I/O. Here, T<p is an upper bound chosen beforehand.

3. Party i's device sends u=r+ts mod p−1 to party j's device.

4. Party j's device verifies that $g^u=zy^t$ mod p.

Cryptography schemes such as Schnorr have the property that if two distinct messages are signed using the same random element (e.g., r), then the secret key of the signer can be computed by anyone having the messages, the signatures, and public information such as the public key of the signer.

2. Prior Art Difficulties Cracking Cryptosystems

Cracking the RSA public key cryptosystem, and several other cryptosystems, is difficult because it typically requires that the modulus be factored (or other operation of comparable complexity). This is particularly difficult. It takes thousands of hours of computing time to factor a 512 bit modulus. RSA currently uses a 512 bit modulus, but it is expected that this may be upgraded in the future to a 1024 bit modulus. However, if the modulus may be determined without significant factoring, the computing time may be greatly reduced and the security of the cryptosystem compromised.

In an article "Timing Attacks on Implementations of Diffie-Hellman, RSA, DSS, and Other Systems," Proc. of Crypto '96, P. Kocher proposes that a few bits of a modulus may be obtained by the amount of time certain operations took to be performed. This allowed the cryptosystem to be cracked without factoring. The drawbacks of this method are (1) it requires very precise timing of the length of time taken to perform certain calculations; and (2) it requires a large number of samples.

3. Reasons For Cracking A Cryptosystem

The availability of electronic commerce and certain electronic communications depend on difficult-to-crack cryptosystems to prevent unauthorized access to the secured information. If, for example, an adversary obtains a party's secret key, the adversary could electronically forge the party's signature without the party's knowledge. As another example, the adversary could present itself to third parties as the party whose secret key was obtained. Moreover, once obtained, the secret key may be duplicated and shared with others. Thus, it is vitally important that the cryptosystem used to protect important information be difficult to crack.

A threat model for cracking a cryptosystem is useful because it verifies whether a cryptosystem or cryptography device is vulnerable to that attack. If so, the system or device is no longer considered to be secure. This is true because in the cryptography community, the mere possibility of an attack on a cryptosystem is universally accepted as very serious. Security experts must assume that the cryptosystem is no longer safe from adversaries. Thus, a method for cracking cryptosystems is an exceptionally useful tool for security experts and cryptosystem designers testing existing cryptosystems and developing new cryptosystems. The cracking method may be applied to an existing or a proposed system to verify that the system is impervious to the attack. Thus, the cracking method may also be used to design cryptosystems impervious to the attack.

Therefore, it is an object of the present invention to provide a method for cracking the public key signature cryptosystems without factoring the modulus.

It is another object of the present invention to provide a method for cracking cryptosystems which uses the Chinese Remainder Theorem.

It is yet a further object of the present invention to provide a method for cracking authentication cryptosystems.

It is yet another object of the present invention to use transient errors in encrypted data to determine secret information.

It is yet a further object of the present invention to provide methods for testing the security of a cryptosystem.

It is a further object of the present invention to provide a method for providing a cryptosystem and/or cryptography device impervious to cracking due to transient hardware faults.

SUMMARY OF THE INVENTION

The present invention is directed to methods for using one or more faulty computations made by a cryptography device to infer secret information stored in the cryptography device. The inventive method is based on the well-accepted proposition that no computing system is perfectly fault free. In a preferred method, a security expert or cryptosystem designer may intentionally induce a tamper proof device or other cryptography device to generate a faulty computation by subjecting the device, such as a smart card, to physical stress. Such physical stress may be, for example, certain types of radiation, atypical voltage levels, or a higher clock rate than the device was designed to operate at or accommodate. Cryptosystems and/or cryptography devices should preferably be impervious to the attacks described herein. If not, the system or device should desirably be modified. In some cases it may be desirable to discard the system.

In certain cryptosystems, such as a signature scheme based on the well known Chinese Remainder Theorem, a single error of any type is sufficient to crack the system. In certain other cryptosystems, such as certain authentication schemes, repeated errors of a specific type are used to crack the system. The inventive methods are useful tools for security experts and cryptography experts when testing or developing a cryptosystem or cryptography device. Thus, the inventive method may be used to provide cryptosystems and/or cryptography devices impervious to cracking due to transient hardware faults.

In a first embodiment of the present invention, the RSA Chinese Remainder Theorem based signature scheme and Rabin's Signature scheme (both of which may separate into linear components) are cracked by comparing a single erroneous signature on a message with a correct signature on the same message. In a second embodiment, these two schemes may be cracked with only a single erroneous signature if the content of the signed message is known.

In a third embodiment, a certain type of fault called a register fault is used to crack the Fiat-Shamir and Schnorr authentication schemes. This is done by receiving a correct and a faulty value during an authentication process to determine a secret value. Using this secret value, sets of data may be constructed which will reveal the other party's secret key.

In a fourth embodiment, erroneous signatures of randomly selected messages are each used to obtain a portion of a secret exponent. When a sufficient number of bits are obtained, the remaining bits may be "guessed" to obtain the entire secret exponent.

The inventive method is a creative use of a cryptography device's miscalculations. Because it is believed that all computers are prone to error, even cryptosystem servers stored in a secure environment may not be secure from these attacks. Thus, even such servers should be tested using the inventive method cracking cryptosystems. These attacks reveal an important finding: cryptography devices—from smart cards to network servers used by certification authorities which oversee the distribution of public key certificates—should now not only conceal their inner circuitry (to avoid revealing its secret key), but must also be fault resistant, to avoid generating erroneous calculations. The present invention provides a method for designing and implementing cryptosystems and cryptography devices impervious to cracking due to transient hardware faults.

BRIEF DESCRIPTION OF THE DRAWINGS

The present invention is described with reference to the following figures:

FIGS. 6A and 6B are flow charts illustrating two conventional exponentiation functions.

DETAILED DESCRIPTION OF PREFERRED EMBODIMENTS

The present invention is described in the following sections:

I. Types of Faults which may occur which permit certain cryptosystems to be cracked are described with reference to FIG. 2.

II. Cracking Cryptographic Signature Implementations that Use the Chinese Remainder Theorem is described with reference to FIGS. 3 and 4, including discussion of the RSA Signature Scheme and the Chinese Remainder Theorem, Cracking the RSA Signature Scheme, and Cracking the Rabin Signature Scheme.

III. Using Register Faults To Break Cryptosystems is described with reference to FIGS. 5, 6A, 6B, and 7, including discussion of Using Register Faults to Attack the Fiat-Shamir Authentication Scheme, Using Register Faults to Crack Schnorr's Authentication Scheme, and Using Register Faults to Crack Other RSA Implementations.

IV. Providing Cryptosystems and Cryptography Devices which Resist Tampering Due to Hardware Faults is described.

V. A Conclusion is provided.

I. Types of Faults a. Overview of Faults

Several types of faults may enable a cryptosystem to be cracked. These faults include transient hardware faults, latent faults, and induced faults.

Figure 1A:
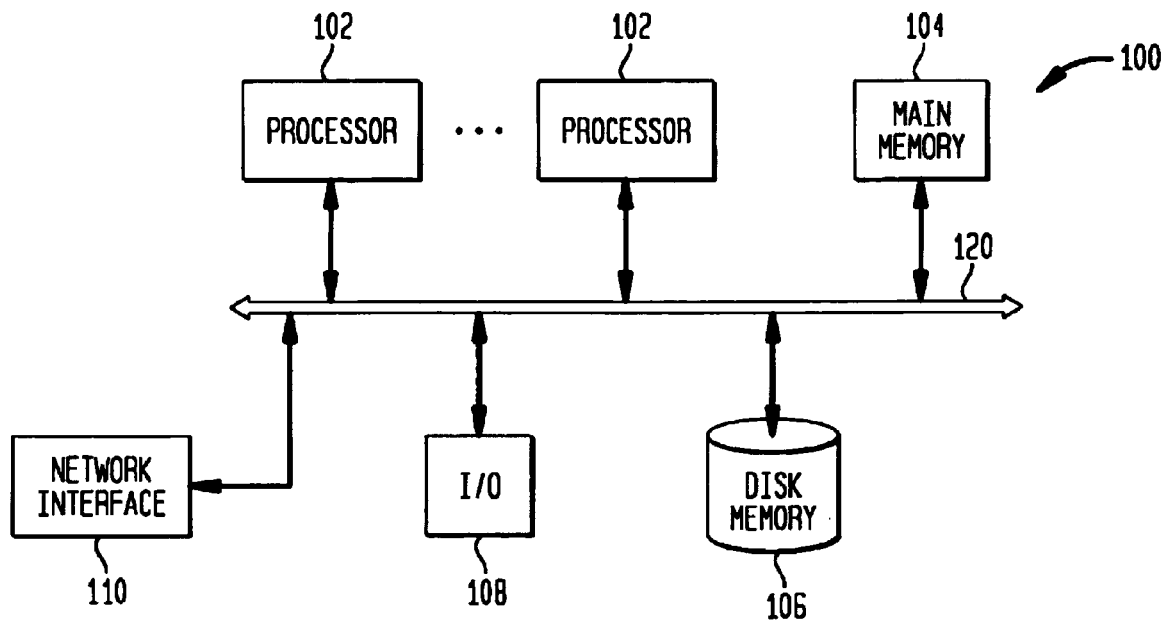
FIG. 1A is a block diagram of a typical cryptography device.

Cryptography devices, such as the device illustrated in FIG. 1A, described above, are subject to random transient hardware faults. Random transient hardware faults may cause an erroneous output from the cryptography device. Referring to FIG. 1A, a random transient hardware fault in the processor 102 or memory 104, 106 may cause the certification authority to generate on rare occasion a faulty certificate. If a faulty certificate is sent to a client, that client may be able to break a certification authority's system and generate fake certificates.

A latent fault is a hardware or software bug which may be difficult to detect. Such bugs may occur in the design of the processor 102, or in the design of software stored in the main memory 104 or the disk memory 106. On rare occasions such bugs may cause a certification authority or other cryptography device to generate a faulty output.

Induced faults may occur when a security expert or cryptosystem designer has physical access to a cryptography device. The security expert or cryptosystem designer may purposely induce hardware faults by, for example, attacking a tamper proof device by deliberately causing it to malfunction. An induced fault may, for example, briefly alter a value stored in the main memory 104 or the disk memory 106. Erroneous values computed by the device allow the security expert or cryptosystem designer to extract secret information stored in the cryptography device.

The present invention generally assumes that any faults generated by the cryptography device are transient. That is, the faults only affect current data, but not subsequent data. A transient fault may be a bit stored in a register which spontaneously flips or a gate which spontaneously produces an incorrect value. In such instances, the hardware system is typically unaware that any change has taken place. The present invention also assumes that the probability of such faults is so small that only a small number of them ever occur during a single computation.

b. Register Faults

A certain type of fault—a register fault—is used to crack certain public key authentication cryptosystems, as described below. A register fault is a transient corruption of data stored in one or more registers. Because one or a few bits in a register are corrupted, the erroneous calculation will have certain predictable properties (such as being a power of 2 or a sum of a few powers of 2).

Figure 2:
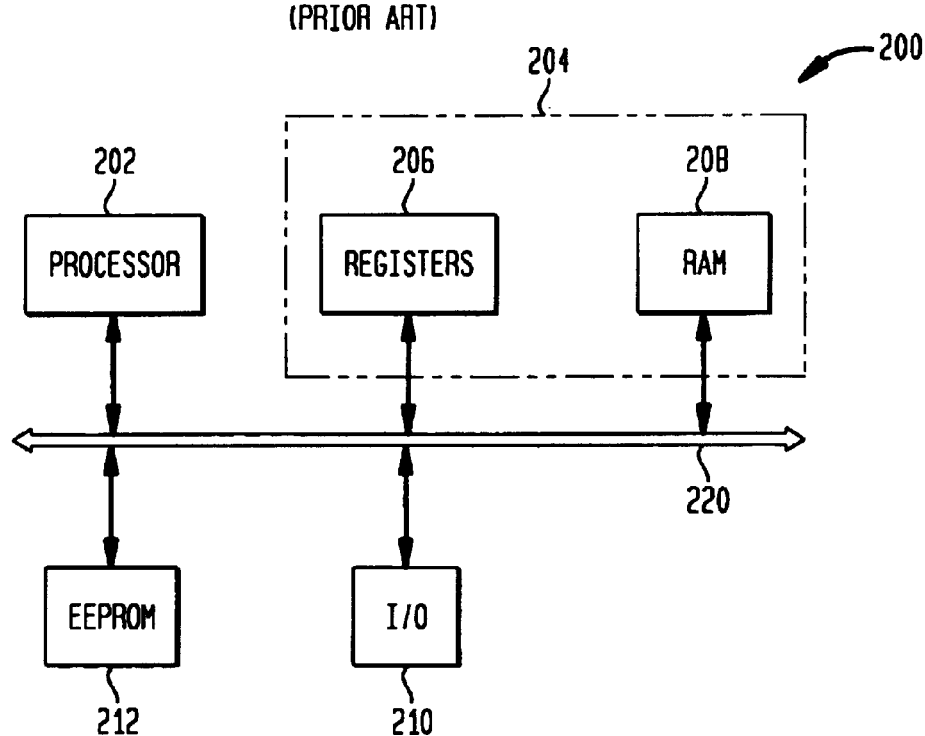
FIG. 2 is a block diagram of a typical tamper proof device, such as a smart card.
Figure 1B:
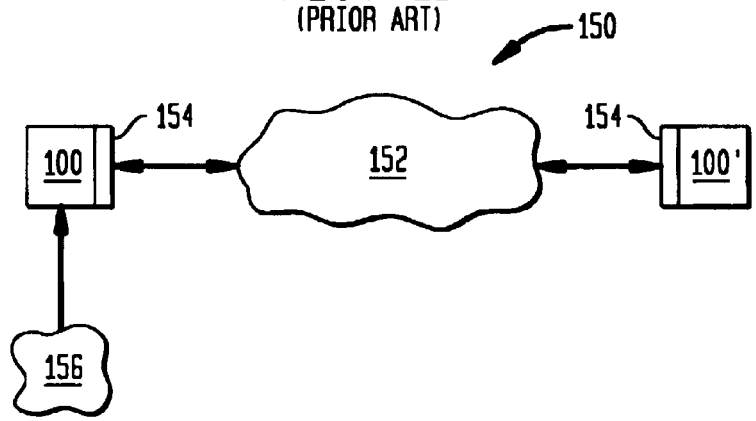
FIG. 1B illustrates a communications network over which cryptography devices may communicate.

As seen in FIG. 2, a tamper proof device 200, such as a smart card, comprises circuity such as a processor 202 and a small amount of memory 204. The circuity 202 performs certain arithmetic operations and the memory (typically several registers 206 and a small RAM 208) stores temporary values. An I/O 210 is provided to receive and transmit data. An electrically erasable programmable read only memory (EEPROM) 212 may be provided for storing secret information, such as secret keys. These components 202–210 are connected by a bus 220.

With low probability, one or a few of the bits of the value stored in some register 206 may invert (e.g., change from a logic 0 to a logic 1 or vice-versa). It is assumed that this event occurs with sufficiently low probability so that there is some likelihood of a fault occurring only once throughout a computation. These errors may be transient and the hardware may not be aware that the data corruption has occurred.

Under normal operating conditions, hardware is substantially error free. However, when such hardware is placed under physical stress, such as being placed in an extreme environment such as exposing it to certain radiation, atypical voltage levels, or fast clock signals, errors are likely to occur. This extreme environment may not affect the circuity, but may cause certain register cells to spontaneously, temporarily invert. Such faults are referred to herein as "register faults". A security expert or cryptosystem designer may intentionally subject a tamper proof device 200, such as a smart card (or other cryptography device), to an extreme environment in order to test whether the device may be induced to generate an erroneous output. If so, the system may be cracked. Also, it is a well-accepted that no computing system is entirely error-free. Thus, even in the absence of physical stress any cryptography device is susceptible to generating an erroneous output on rare occasions.

II. Cracking Cryptographic Signature Implementations that Use the Chinese Remainder Theorem One version of the present invention relies on the Chinese Remainder Theorem (CRT) to crack the RSA/CRT and Rabin modular square schemes. The Chinese Remainder Theorem is well known and described, for example, in A. Aho, J. Hopcroft, and J. Uilman, *The Design and Analysis of Computer Algorithms*, pp. 294–303 (Addison-Wesley 1974). The content of this reference is incorporated herein by reference.

a. The RSA Signature Scheme and The Chinese Remainder Theorem

The RSA signature scheme may be implemented in a tamper proof device 200, such as a smart card, and may be used to perform various encryption and decryption functions for its owner, party i. The tamper proof device typically contains in the registers 206 a secret RSA decryption key which is used to decrypt messages for party i. This device 200 may be used, for example, to prepare digital signatures for party i, to authenticate party i to another party j, and to decrypt incoming encrypted messages. Assume that some secret information (such as party i's secret key) is stored in a tamper proof device. Because the device 200 is tamper proof, it cannot be opened and its contents examined. Thus, it is assumed that the secret information stored in the device cannot be extracted by opening the device.

For illustrative purposes, the present version of the invention will be described as a device for obtaining digital signatures for party i. Let N=pq be a product of two large prime numbers. To sign a message m using the RSA signature scheme, the tamper proof device 200 uses the processor 202 to compute $E=m^{s_i}$ (mod N) where $s_i$ is a secret exponent stored in the register 206. The message m is assumed to be an integer in the range from 1 to N. As described above, the security of this system relies on the fact that factoring the modulus N is difficult. If the factors p,q of N are known, one can easily crack the system and sign documents without prior knowledge of the secret exponent $S_i$.

The computationaly expensive part of signing using the RSA scheme is the modular exponentiation of the input m, which is performed by the processor 202. For efficiency, many implementations of the RSA scheme exponentiate signature E into two portions $E_1$ and $E_2$ as follows: first $E_1=x^s$ (mod p) and $E_2=x^s$ (mod q) are computed. Second, the Chinese Remainder Theorem is used to compute the RSA scheme signature $E=m^{s_i}$ (mod N).

Let a, b be two integers pre-computed by the processor 202 and stored in memory 206, which integers satisfy:

$$a \equiv 1 (\bmod\ p)\ b \equiv 0 (\bmod\ p)$$

and $$a \equiv 0 (\bmod\ q)\ b \equiv 1 (\bmod\ q) \quad (2)$$

Such integers always exists and can easily be determined by the processor 202 given p and q. It now follows that:

$$E=aE_1+bE_2 (\bmod\ N) \quad (3)$$

The signature E is computed by processor 202 by forming a linear combination of $E_1$, $E_2$. This exponentiation algorithm is more efficient than using the processor 202 repeatedly to square modulo N because the numbers involved are smaller.

b. Cracking the RSA Signature Scheme

Figure 3:
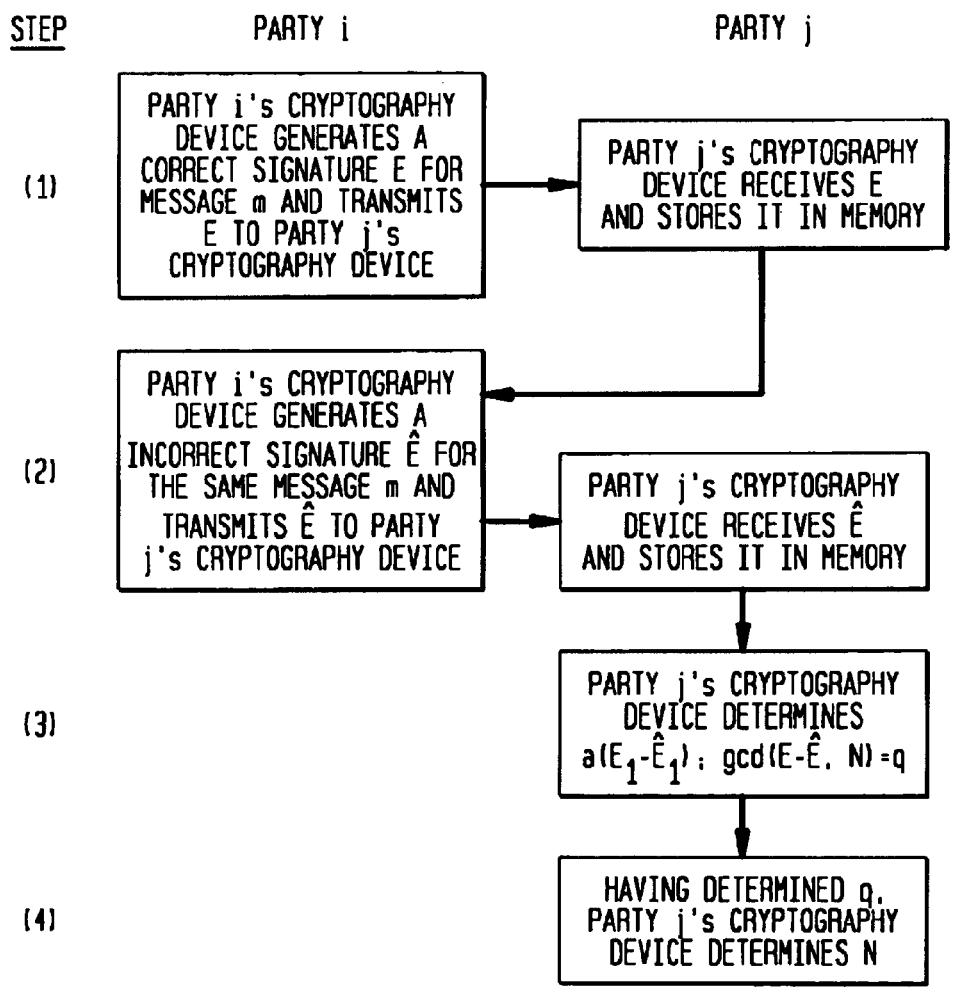
FIG. 3 illustrates a first method according to the present invention.

1, Cracking the RSA Signature Scheme by Comparing a Correct and an Incorrect Signature Using the linear combination set out above, the modulus N may be determined by a cryptography device such as the device 100 seen in FIG. 1A or a computer or other processor by comparing a correct signature E with an incorrect signature Ê for the same message. The inventive method is illustrated in FIG. 3. Let m be a plain text message and let $E=m^{s_j}$ (mod N) be the correct cryptographic signature of the message received by cryptographic device 100 at the I/O 108 and stored in memory 104 or 106. Let Ê be a faulty cryptographic signature for the same message m, and which is also received by the device 100 and stored in memory 104 or 106.

As seen in FIG. 3, party i's cryptography device 200 generates signature E for message m. E is transmitted to party j's cryptography device (or other processor) 100. Party j's cryptography device stores E in memory (step 1). Party j may be a security expert or cryptosystem designer. For clarity of illustration, the inventive method is described as a first cryptography device generating faulty computations and a second cryptography device or processor "cracking" the cryptosystem. It is also contemplated, however, that the inventive method may be performed by a single cryptography device. Party i's cryptography device generates an erroneous signature Ê for the same message m. This erroneous signature may be generated, for example, while a tamper proof device 200 is placed under physical stress, such as being placed in an extreme environment, which is likely to cause hardware faults. Ê is transmitted to party j's cryptography device or processor. Party j's cryptography device 100 stores Ê in memory (step 2).

Recall that E and Ê are computed as: $E=aE_1+bE_2$ (mod N) and $\hat{E}=a\hat{E}_1+b\hat{E}_2$ (mod N), respectively. Because hardware faults occur with low probability, it is reasonable to assume that a hardware fault occurs during the computation of only one of $\hat{E}_1$, $\hat{E}_2$. Thus, it is assumed that a hardware fault occurs during the computation of $\hat{E}_1$, but no fault occurs during the computation of $\hat{E}_2$. Thus, $\hat{E}_2=E_2$.

Party j's cryptography device now uses E and Ê to obtain N in the following manner. Observe that:

$$E-\hat{E}=(aE_1+bE_2)-(a\hat{E}_1+b\hat{E}_2) \quad (4)$$

Because $\hat{E}_2=E_2$, this equation becomes:

$$aE_1+bE_2-a\hat{E}_1-b\hat{E}_2=aE_1-a\hat{E}_1=a(E_1-\hat{E}_1)$$

If $E_1-\hat{E}_1$ is not divisible by p, then:

$$gcd(E-\hat{E},N)=gcd(a(E_1-\hat{E}_1,N))=q \quad (5)$$

(step 3). Once q is obtained, party j's cryptography device or processor 100 may easily determine N (step 4).

If the factors of N are randomly chosen by the tamper proof device 200, then it is extremely unlikely that p divides $E_1-\hat{E}_1$. This is unlikely because $E_1-\hat{E}_1$ can have at most log N factors. This limited number of factors is because the lengths of E and $\hat{E}$ limit the number of times these numbers may be divided by a smaller quantity.

By using one faulty and one correct value of the same RSA signature, the modulus used in the RSA system can be easily determined. In this attack, it makes no difference what type of fault occurs or how many faults occur in the computation of $E_1$. Moreover, to determine the modulus N, only one correct and one incorrect signature of the same message needs to be received. All that is assumed is that the fault occurs in the computation modulo of one of the primes p, q only.

2. Cracking the RSA Signature Scheme Using only an Incorrect Signature

Figure 4:
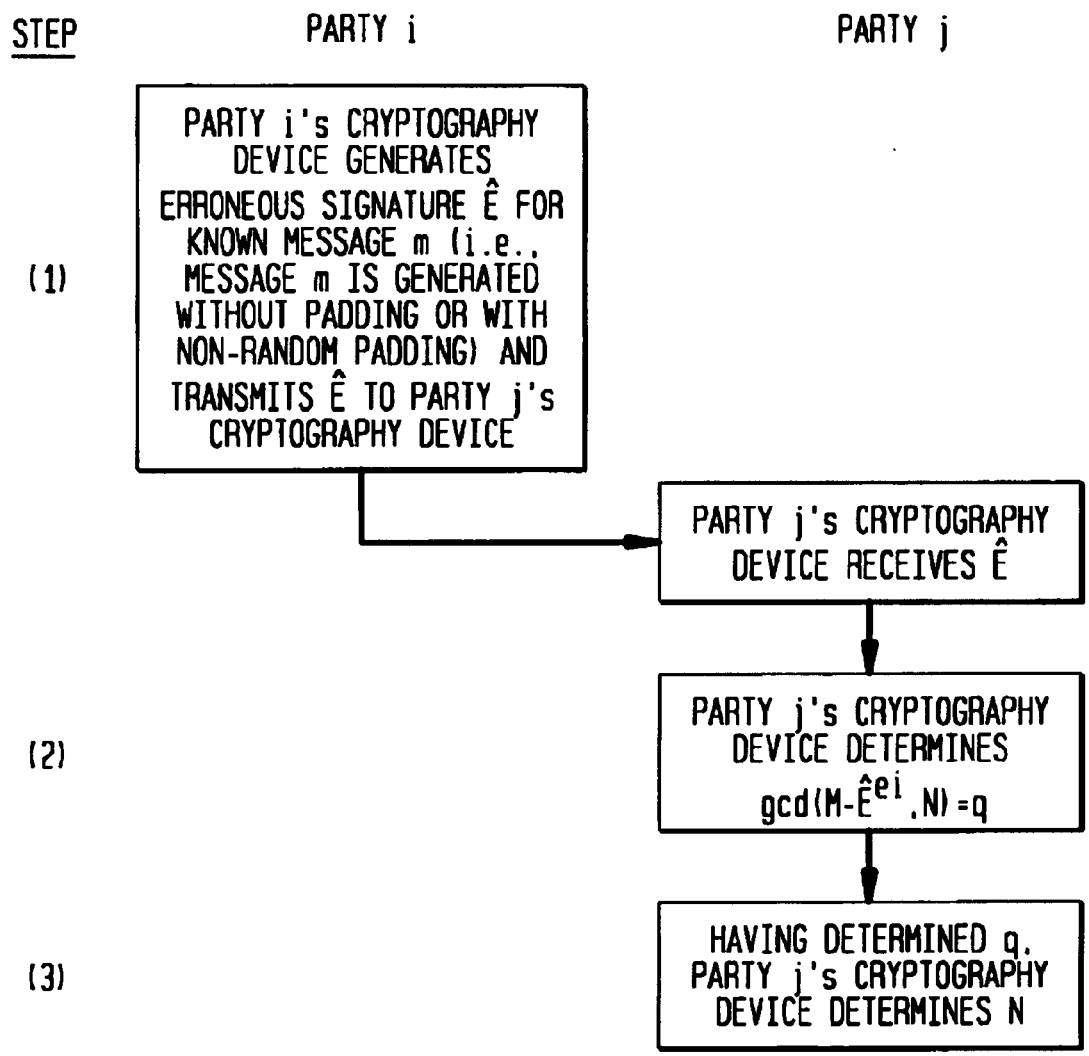
FIG. 4 illustrates a second method according to the present invention.

In fact, one faulty signature of a known message m is sufficient to obtain N. This version of the inventive method is illustrated in FIG. 4. No correct signature of the same message is required. Let $E=m^{si} \mod N$. Let $\hat{E}$ be a faulty signature having the same fault as above, that is $E \equiv \hat{E} \mod q$ but $E \neq \hat{E} \mod p$. Party i's cryptography device 200 generates $\hat{E}$ and transmits $\hat{E}$ to party j's cryptography device or processor 100. Party j's cryptography device or processor receives $\hat{E}$. (step 1). It now follows that:

$$gcd(M-\hat{E}^{ei}, N)=q \tag{6}$$

where $e_i$ is the public exponent (or public key) used to verify the decrypted signature, i.e., $E^{ej}=m \mod N$ (step 2). Once q is determined, party j's cryptography device 100 or processor may easily factor N (step 3). Thus, if the cryptography device 100 or processor knows message m, it may factor the modulus given only one faulty signature. This is important because some RSA signature implementations avoid signing the same message twice by using a "padding" technique.

If the padding is not random (i.e., the padding is an n-bit number appended to the end of the message), the message m may be determined. This improvement shows that as long as the entire signed message is known, even non-random padding protected RSA/CRT systems are vulnerable to the hardware faults attack with only a single faulty signature. If the padding is random, then the message m cannot be separated from the padding and the message m is not known. This method will not work if the message is not known.

c. Cracking the Rabin Signature Scheme

The expensive part of signing using Rabin's signature scheme is the extraction of the modular square root. This, as with the RSA signature scheme, is usually implemented using the Chinese Remainder Theorem. A cryptography device such as a smart card 200, may use its processor 202 to compute:

$$E=\sqrt{D}(\mod N) \tag{7}$$

The processor 202 first computes:

$$E_1=\sqrt{D}(\mod p) \text{ and } E_2=\sqrt{D}(\mod q) \tag{8}$$

This is done using a standard square root algorithm modulo a prime. The processor 202 may use the Chinese Remainder Theorem to compute signature E. Using the same a, b, defined above, E is determined as:

$$E=aE_1+bE_2(\mod N) \tag{9}$$

Because the Rabin Signature Scheme may be divided into a linear equation similar to the RSA signature scheme (see eq. 4), the same attacks described above with reference to FIGS. 3 and 4 may be used to crack the device using the Rabin signature scheme. Under the first attack (FIG. 3), the device signs the same message twice, one signature, E, is obtained in normal conditions and is therefore the correct one. The second signature, $\hat{E}$, is erroneous. The erroneous signature $\hat{E}$ may be obtained, for example, in an extreme physical environment and therefore is likely to be the erroneous signature. As described above, gcd $(E-\hat{E}, N)$ is likely to yield a factorization of N. Under the second attack (FIG. 4), if the cryptography device 100 or other processor knows document D it may factor the modulus without comparing it to a correct signature of the same message.

III. Using Register Faults to Crack Cryptosystems a. Using Register Faults to Attack the Fiat-Shamir Authentication Scheme The Fiat-Shamir authentication scheme may be cracked by correctly guessing the value of the error caused by a register fault. Because register faults have known properties (they are powers of 2 or a product of powers of 2), the error may be easily guessed by a processor. Using the Fiat-Shamir authentication scheme, a security expert's or cryptosystem designer's cryptography device 100, computer, or other processor may compare an erroneous message with a correct message to obtain a random number r selected by party i's cryptography device, such as a tamper proof device 200 of FIG. 2. Once r is known, the security expert's or cryptosystem designer's cryptography device 100 or other processor may perform calculations to determine party i's secret key.

Party i's secret key, comprising a number of bits $s_1, \ldots, s_t$, may be recovered by party j's cryptography device by using register faults. Given t faulty runs of the protocol, party j's cryptography device may recover the secret key bits $s_1, \ldots, s_t$ with probability of ½ using $0$ $(n^2t)$ arithmetic operations, where 0 is order of magnitude.

Figure 5A:
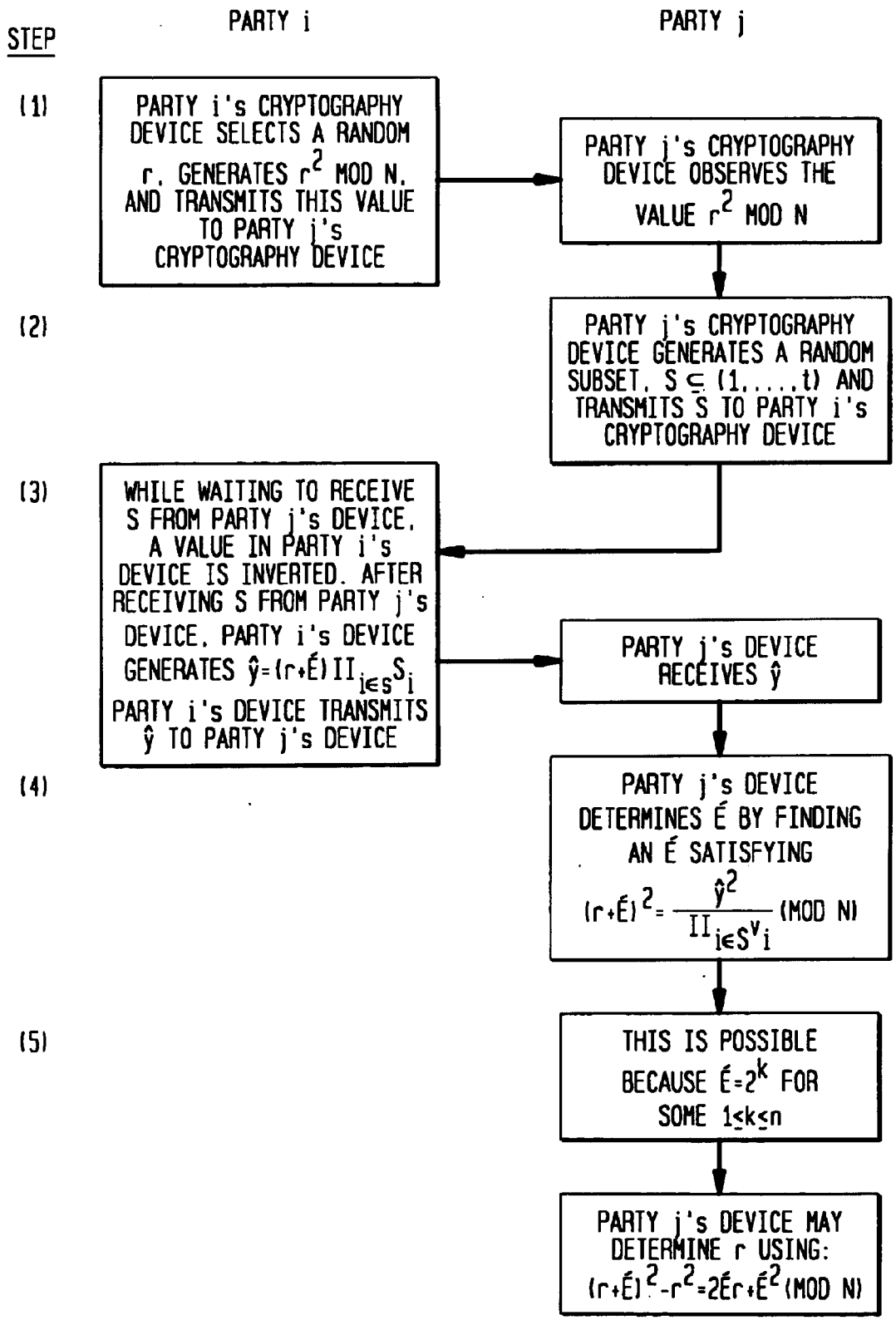
FIG. 5 illustrates a third method according to the present invention.

This inventive method is illustrated in FIG. 5. Assume party i uses a tamper proof device 200 on which the secret key bits are embedded in register 206 and from which the secret key bits cannot be extracted. Party j is a security expert or cryptosystem designer trying to discover the secret key bits stored in party i's tamper proof device. To do so, party j's cryptography device executes the protocol below several times. The protocol is performed as follows. Party i's device generates $r^2 \mod N$ and transmits this value to party j's device. Party j's cryptography device observes the value $r^2 \mod N$ generated by party i's device (step 1). Party j's cryptography device then selects a subset $S \subseteq (1, \ldots t)$ (step 2) and observes the value $y=\Pi_{i \in s}s_i$ returned to the device.

Assume that due to a register fault in party i's tamper proof device, one bit of a register holding a value r is inverted while party i's device is waiting for party j to send to it subset S. In this case, party j has already received the correct $r^2 \mod N$ value during step 1 of the protocol. However, the y value computed by party i in step 3 is incorrect. Due to the register fault, party i's device outputs:

$$\hat{y}=(r+\acute{E})\Pi_{i \in s}s_i \tag{10}$$

where $\acute{E}$ is the value added to the register as a result of the register fault (step 3). This value is transmitted to party j's device. Recall that party j's cryptography device knows the value of $\Pi_{i \in s}v_i$ from step 4 of the Fiat-Shamir protocol. Thus, party j's cryptography device may compute:

$$\left(r+\acute{E}\right)^2 = \frac{\hat{y}^2}{\Pi_{i \in S} V_i} (\text{mod } N) \qquad (11)$$

wherein $v_j = s_i^2$

Because É is an inverted bit in a register, it is a binary number of low weight, i.e., a power of 2 or a sum of few powers of 2 (i.e., $\acute{E}=2^k$ for some $1 \leq k \leq n$). Thus, party j's cryptography device can easily determine the value of É by selecting all possible values of É until the correct value is determined (step 4). If É is correctly guessed, then party j's cryptography device may recover r because:

$$(r+\acute{E})^2 - r^2 = 2\acute{E}r + \acute{E}^2 (\text{mod } N) \qquad (12)$$

(step 5). This linear equation for r can be easily solved. Party j's ability to discover the secret random r is the main observation which permits the system to be cracked.

Using the values of r and É, party j's cryptography device may compute:

$$\Pi_{i \in S} s_i = \frac{\hat{y}}{r+\acute{E}} (\text{mod } N) \qquad (13)$$

Thus, party j may compute the value $\Pi_{i \in S} s_i$ by guessing the fault value É and using the formula:

$$\Pi_{i \in S} s_i = \frac{2\acute{E}\hat{y}}{\frac{\hat{y}^2}{\Pi_{i \in S} v_i} - r^2 + \acute{E}^{\prime 2}} (\text{mod } N) \qquad (14)$$

(step 6).

Party j may now verify that fault value É was correctly guessed. Let T be the guessed value of $\Pi_{i \in S} s_i$ obtained from equation (14) above. To verify that É is correct, party j's cryptography device checks that $T^2 = \Pi_{i \in S} v_i$. There is a high probability that only one low-weight value É exists where this relationship is satisfied. Therefore, if the relationship is satisfied, party j is very likely to have obtained the correct value of $\Pi_{i \in S} s_i$.

In the unlikely event of two values É, É' satisfying the relation, party j may still crack the cryptosystem. Observe that the relation $(y')^2 = (r')^2 T^2$ implies that $T^2 = \Pi_{i \in S} s_i$. If there exists two low weight values É, É' generating two values T, T', wherein T≠T' satisfying the relationship, then $T^2 = T'^2$ (mod N). If T≠T' (mod N) then party j's cryptography device already may factor N.

Assume T=−T' (mod N). Because one of T or T' equals $\Pi_{i \in S} s_i$ (i.e., one of É, É' is the correct fault value), it follows that party j now knows that $\Pi_{i \in S} s_i$ up to the sign. This is sufficient to crack the cryptosystem. Because É is a low weight binary value, party j's cryptography device may substitute all possible values for É until the correct value is determined.

Once party j has a method for determining $\Pi_{i \in S} s_i$ for various sets of S of party j's cryptography device's choosing, party j may easily find party i's secret key bits $s_1, \ldots, s_t$. A simple approach is for party j's cryptography device to construct $\Pi_{i \in S} s_i$ for singleton sets, i.e., sets S containing a single element. If S={k}, then $\Pi_{i \in S} s_i = s_k$ and therefore $s_k$ may be found for each k. If party i's tamper proof device 200 refuses to accept a singleton set, party j may still find party i's secret keys in the following manner. Party j's cryptography device may select sets at random such that resulting characteristic vectors are linearly independent. A set is represented as follows: $S \subseteq (1, \ldots, t)$ by its characteristic vector $U \in (0,1)^t$. That is, $U_i=1$ if $i \in S$ and $U_i=0$ otherwise. Party j picks sets $S_1, \ldots, S_t$ such that a corresponding set of characteristic vectors $U_1, \ldots, U_t$ form a txt full rank matrix over $Z_2$, where $Z_2$ is a ring of integers, modulo 2 (step 7). Party j's cryptography device then performs the Fiat-Shamir authentication scheme above to construct the values $T_{i=\Pi_{i \in S} s_i}$ for each of the sets $S_1, \ldots, S_t$ (step 8).

For example, party j may determine $s_1$, by constructing elements $a_1, \ldots, a_t \in \{0, 1\}$ such that:

$$a_1 U_1 + \ldots + a_t U_t = (1, 0, 0, \ldots, 0)(\text{mod } 2) \qquad (15)$$

These elements may be efficiently constructed because the vectors $U_1, \ldots, U_t$ are linearly independent over $Z_2$. When all the computations are completed over the integers, the following is obtained:

$$a_1 U_1 + \ldots + a_t U_t = (2b_1+1, 2b_2, 2b_3, \ldots, 2b_t) \qquad (16)$$

for some known integers $b_1, \ldots, b_t$. Party j's cryptography device may now compute $s_1$ using the formula:

$$s_i = \frac{T_1^{a_1} \ldots T_t^{a_t}}{v_1^{b_1} \ldots v_t^{b_t}} (\text{mod } N) \qquad (17)$$

(step 9). Recall that the values $v_i = s_i^2$ (mod N) are publicly available. The values $s_2, \ldots, s_k$ may be obtained using the same procedure.

The procedure above made use of t faults and took O ($n^2 t$) arithmetic operations. The faults occur while party i's device is waiting for a challenge from the outside world. Consequently, the security expert knows when the register faults are induced.

The Fiat-Shamir scheme may be modified. Recall that in the Fiat-Shamir protocol set out above, in step 2, party i sends $r^2$ (mod N) to party j; and in step 4, party j verifies party i's identity by checking that $y^2 = r^2 \Pi_{i \in S} v_i$ (mod N). If this protocol is modified to use higher powers instead of just squaring the values, the inventive method illustrated in FIG. 5 may still be used to crack the modified scheme.

Assume that the modified scheme uses a publicly known exponent e instead of squaring. As before, party i's secret key is a set of invertible elements (bits) $s_1, \ldots, s_t$ (mod N). Party i's public key is a set of bits $v_1 = s_1^e, \ldots, v_t = s_t^e$ (mod N). Party authenticates itself to party j using the following protocol:

1. Party i's cryptography device, computer, or other processor selects a random r, generates $r^e$ mod N and transmits this value to party j via an I/O.
2. Party j's cryptography device or other processor selects a random subset $S \subseteq (1, \ldots, t)$, and sends the subset to party i's device via an I/O.
3. Party i's cryptography device computes $r \Pi_{i \in S} s_i$.
4. Party j's cryptography device verifies party i's identity by checking that $y^e = r^e \Pi_{i \in S} v_i$ (mod N).

When e=2, this protocol is the same as the original Fiat-Shamir protocol described above. Using the methods described above, party j may obtain the value $L_1 = r^e$ (mod N) and $L_2 = (r + \acute{E})^e$ mod N. As above, assume that party j's cryptography device has correctly guessed the value of É. Given these two values, party j's device may recover r by observing that r is a common root of the two polynomials: $x^e = L_1$ (mod N) and $(x+E)^e = L_2$ (mod N). Furthermore, r is likely to be the only common root of the two polynomials. Consequently, when the exponent e is small, e.g., $e < n^2$, party j may recover r by computing the greatest common divisor of the two polynomials. Once party j has a method for computing r he can recover the secret key bits $s_1, \ldots, s_l$ as discussed above.

b. Using Register Faults to Crack Schnorr's Authentication Scheme

Using register faults, secret integer $s_i$ of the Schnorr authentication scheme may be extracted from party i's cryptography device. When p is an n-bit prime number, the attack requires n log n faulted values and $O(n^2)$ arithmetic operations. This is done as follows:

Let p be an n-bit prime number. Given n log n faulty runs of the protocol, secret key $s_i$ may be recovered with probability at least ½ using $O(n^3)$ arithmetic operations.

Party j wishes to extract the secret information stored in the device. Party j's cryptography device or other processor selects a random challenge t. The same challenge will be used in all invocations of the protocol. Because party i's device cannot possibly store all challenges given to it thus far, it cannot possibly know that party j is always providing the same challenge t. The attack will enable party j to determine the value $t \cdot s_j$ mod p from which the secret value $s_i$ can be easily found. For simplicity, set $x = t s_j$ mod p and assume that $g^x$ mod p is known to party j's device.

Suppose that due to a register fault in party i's device, one of the bits of the register 206 holding the value r is flipped while the device is waiting for party j's device to send it the challenge t. More precisely, when the third phase of the protocol is executed, the party i's device finds $\hat{r} = r + 2^i$ in the register holding r. Consequently, party i's device will output $\hat{u} = \hat{r} + x$ mod p. Party j's device may then determine the value of i (the fault position) by trying all possible values $i = 0, \ldots, n$ until finding an i satisfying:

$$g^{\hat{u}} = g^{2^i} g^r g^x \pmod{p} \tag{18}$$

Assuming a single bit flip, there is exactly one such i. The above identity proves to party j that $\hat{r} = r + 2^i$ showing that the ith bit of r is 1.

This information permits party j to recover x in time $O(n^2)$. Assuming that the register faults occur at uniformly and independently chosen locations in the register r, s, may be recovered in time $O(n^2)$. It follows that with probability at least ¾ that a fault will occur in every bit position of the register r. In other words, for every $1 \leq i \leq n$ there exists an $r^{(j)}, \ldots, r^{(k)}$ such that the ith bit of $r^{(j)}$ is known to party j (the first bit is the LSB).

To recover $s_i$, party j's cryptography device first guesses the log 8n bit strings until the correct one is found. Let X be the integer that matches x on the most significant log 8n bits and is zero on all other bits. Party j's device correctly guesses the value of X. Party j's device may recover the rest of $s_i$ starting with the LSB. Inductively, suppose party j's device has already determined bits $s_{i-1}, \ldots, s_2, s_1$ of x. (Initially i=1). Let:

$$Y = \sum_{j=1}^{i-1} 2^j x_j \tag{19}$$

To determine bit $s_{i'}$ party j's device uses $r^{(i)}$ of which it knows the ith bit and the value of $x + r^{(j)}$. Let b be the ith bit of $r^{(i)}$. Then $$x_i = b \oplus i'th\ \text{bit}(x + r^{(i)} - Y - X \bmod p - 1) \tag{20}$$

assuming no wrap around, i.e., $0 \leq x + r^{(j)} - Y - X < p - 1$ (the remainder cannot be greater than the number being divided). Because $x - X < p/8n$, wrap around may occur only if $r^{(i)} > (1 - \frac{1}{8n})p$. Since the rs are independently and uniformly chosen in the range $[0,p)$, the probability that this does not happen in all n iterations of the method is more than ¾.

Once X is correctly determined, the method runs in linear time and outputs x with probability at least ½. (The reason for the ½ is that all bits of r should be "covered" by faults and all $r_i$ should not be too large. Both events are satisfied with probability at least ½.) Of course, once a candidate x is found, it can be easily verified using the public data. There are $O(n)$ possible values for X and thus, the running time of this step is $O(n^2)$.

This attack also works in the case of multiple bit flips of the register r. As long as the number of bit flips is constant, their exact location can be found and used by party j. Note that the faults occur while party i's device is waiting for a challenge from the outside world. Consequently, party j knows exactly at what time the faults should be induced.

c. Using Register Faults to Crack RSA Implementations

Register faults may be used to break other RSA implementations that are not based on the Chinese Remainder Theorem. Let N be an n-bit RSA composite and $s_i$ be a secret exponent. The exponentiation function $x \to x^{s_i}$ mod N may be computed using either of the following conventional methods 600, 650 illustrated in FIGS. 6A and 6B:

Method I (FIG. 6A)
init $y \gets x$; $z \gets 1$ (step 602).
main For $k = 1, \ldots, n$ (steps 604, 610).
   if kth bit of s is 1 (step 606) then $z \gets zy$ (mod N) (step 608).
   $y \gets y^2$ (mod N) (step 610).
Output z (step 612).

Method II (FIG. 6B)
init $z \gets x$ (step 652).
main For $k = n - 1$ down to 1 (steps 654, 662).
   if kth bit of s is 1 (step 656) then $z \gets z^2 x$ (mod N) (step 658)
   otherwise, $z \gets z^2$ (mod N) (step 660).
Output z (step 664).

For both methods 600, 650, given several faulty values by a cryptography device, a security expert's or cryptosystem designer's cryptography device, computer, or processor may obtain the secret exponent in polynomial time. In this version of the invention, faulty values are obtained in the presence of register faults. This attack uses erroneous signatures of randomly chosen messages; the attacker need not obtain the correct signature of any of the messages. Furthermore, an attacker's cryptography device or processor need not obtain multiple signatures of the same message.

With probability of at least ½, the secret exponent $s_i$ can be extracted from a device (such as smart card 200) implementing the first exponentiation algorithm by collecting $(n/m)$ log n faults and $O(2^m \cdot n^3)$ RSA encryptions, for any $1 \leq m < n$. For a small public exponent $e_i$ this takes $O(2^m \cdot n^4)$ time. For a random $e_i$ it takes $O(2^m \cdot n^5)$ time.

The following faults are used: let m be a message to be signed and $m \in Z_N$, where $Z_N$ is a ring of integers modulo N. Suppose that a register fault occurs at a single random point during the computation of $m^{s_j}$ mod N. That is, at a random point in the computation one of the bits stored in a register (such as register 206) flips. The resulting erroneous signature is $\hat{E}$. An ensemble of such erroneous signatures enables one to recover the secret exponent $s_i$. Even if other types of faulty signatures are added to the ensemble, they do not confuse the inventive method.

Let $I=(n/m)\log n$ and let $m_1, \ldots, m_L \in Z_N$ be a set of random messages. Set $E_i = m_i^{si} \mod N$ to be the correct signature of a message $m_i$. Let $\hat{E}$ be an erroneous signature of the message $m_i$. A register fault occurs at exactly one point during the computation of $\hat{E}_i$. Let $k_i$ be the value of $k$ (recall k in the counter in Method I, 600 above) at the point at which the fault occurs. Thus, for each faulty signature $\hat{E}_i$ there is a corresponding $k_i$ indicating the time at which the fault occurs. The messages may be sorted by a processor (i.e., 202 of FIG. 2) so the $1 \leq k_1 \leq k_2 \leq \ldots < k_i < n$. The time at which the faults occur is chosen uniformly (among the n iterations) and independently at random. It follows that given I such faults, with the probability at least half $k_{i+1} - k_i <$ for all $i=1, \ldots, n$. Since the location of the faults are unknown, the values $k_i$ are also unknown.

Let $s_1 = s_n, s_{n-1}, \ldots, s_1$ be the bits of the secret exponent $s_i$ where $s_n$ is the MSB and $s_1$ is the LSB. Each of the bits in $s_i$ is recovered one-by-one. A block of these bits at a time may be recovered starting with the MSBs. Assume bits $s_n, s_{n-1}, \ldots, s_{ki}$ for some i are known. Initially $i=I+1$ indicating that no bits are known and it is desired to determine the next bit. Bits $s_{ki-1}, s_{ki-2}, \ldots, s_{ki-1}$ may be recovered in the following manner. All possible bit vectors are tried by a cryptography device or computer until the correct one is found. Note that the location within $s_i$ of each bit $s_n, s_{n-1}, \ldots$ is unknown. Because even the length of the block is unknown, all possible lengths are tried. The inventive method for determining the next bit may be performed by a cryptography device or computer processor using the method 700 illustrated in FIG. 7 and set out below.

1. Initialize $r=0$ (step 702);
2. For all lengths $r=0, 1, 2, 3, \ldots$ (step 704) do:
3. For all candidate r-bit vectors $U_{ki}$-$s_1$ $U_{ki}$-$2$ . . . $U_{ki-r}$ (step 706) do:
4. Set:

$$w = \sum_{y=k_i}^{n} s_j 2^j + \sum_{j=k_i-r}^{k_j-1} u_j 2^j. \quad (21)$$

In other words, w matches the bits of s and U at all known bit positions and is zero everywhere else (step 708).

5. Test if the current candidate bit vector is correct by checking if one of the erroneous signatures $\hat{E}_j$, $j=1, \ldots, I$ satisfies (step 710):

$$\exists e \in \{0, \ldots, n\} \text{ s.t. } (\hat{E}_j \pm 2^e m_j^w)^{ei} = m_j \pmod{N} \quad (22)$$

wherein e is the public exponent. (The ± means that the condition is satisfied if it holds with either a plus or a minus.) This step means that all combinations of bits using this erroneous bit are tested until the proper location is found. The inverse of the erroneous bit is the correct bit in that location.

6. If a signature satisfying the above condition is found (step 712), the cryptography device outputs $u_{ki-1}$ $u_{ki-2} \ldots u_{ki-1}$ and stops (step 714) for that r. At this point it is determined that $k_{i-1} = k_i - r$ and $s_{ki-1} s_{ki-2}, \ldots, s_{ki-1} = u_{kj-1} u_{ki-2}, \ldots, u_{ki-1}$. If a signature satisfying the condition is not found, another candidate vector is tried (step 716).

Steps 706–716 are repeated for each r between 0 and n (steps 718, 704). The condition at step 710 is satisfied by the correct candidate $u_{ki-1}, u_{ki-2}, \ldots, u_{ki-1}$. Recall that $\hat{E}_{i-1}$ is obtained from a fault at the $k_{i-1}$st iteration. At the $k_{i-1}$st iteration, the value of z was changed to $\hat{z} \leftarrow z \pm 2^e$ for some public exponent e. Notice that at this point $\hat{E}_{i-1} = zM^w_{i-1}$. From that point on no fault occurred and therefore the signature $\hat{E}_{i-1}$ satisfies:

$$\hat{E}_{i-1} = \hat{z} M w_{i-1} = \hat{E}_{i-1} \pm 2^e M w_{i-1} \pmod{N} \quad (23)$$

When in step 710 the signature $\hat{E}_{i-1}$ is correct, it properly verifies when raised to the public exponent e. Consequently, when the correct candidate is tested, the faulty signature $\hat{E}_{i-1}$ guarantees that it is accepted. There is a high probability that a wrong candidate will not pass the test.

Note that not all of the bits need to be determined in this manner. For example, if 450 bits of a 512 bit key are determined through register faults, the unknown 62 bits may be tested by trying different combinations of these unknown bits. Each combination is used as the secret key $s_i$ and a received message is attempted to be decrypted. If the message is properly decrypted, the combination used is correct.

If the method obtains both the faulty and correct signature of each message mj, the running time is improved to $O(2^m n^2)$ arithmetic operations modulo N which takes time $\tilde{O}(2^m n^3)$. This follows since the error location $\hat{E}$ can be easily found using a lookup table of powers of 2 mod N.

Using these algorithms, given n log n faulted values a cryptography device, computer, or other processor may recover the secret exponent in polynomial time. That is, for a message $m \in Z_N$, given n log n faulted values output by a device computing the function $m^{sj} \mod N$, the secret exponent $s_i$ may be recovered in polynomial time in n. A cryptography device or computer may employ either one of the exponentiation methods above. Note that faulted values for this version of the present invention are register faults.

Figure 7:
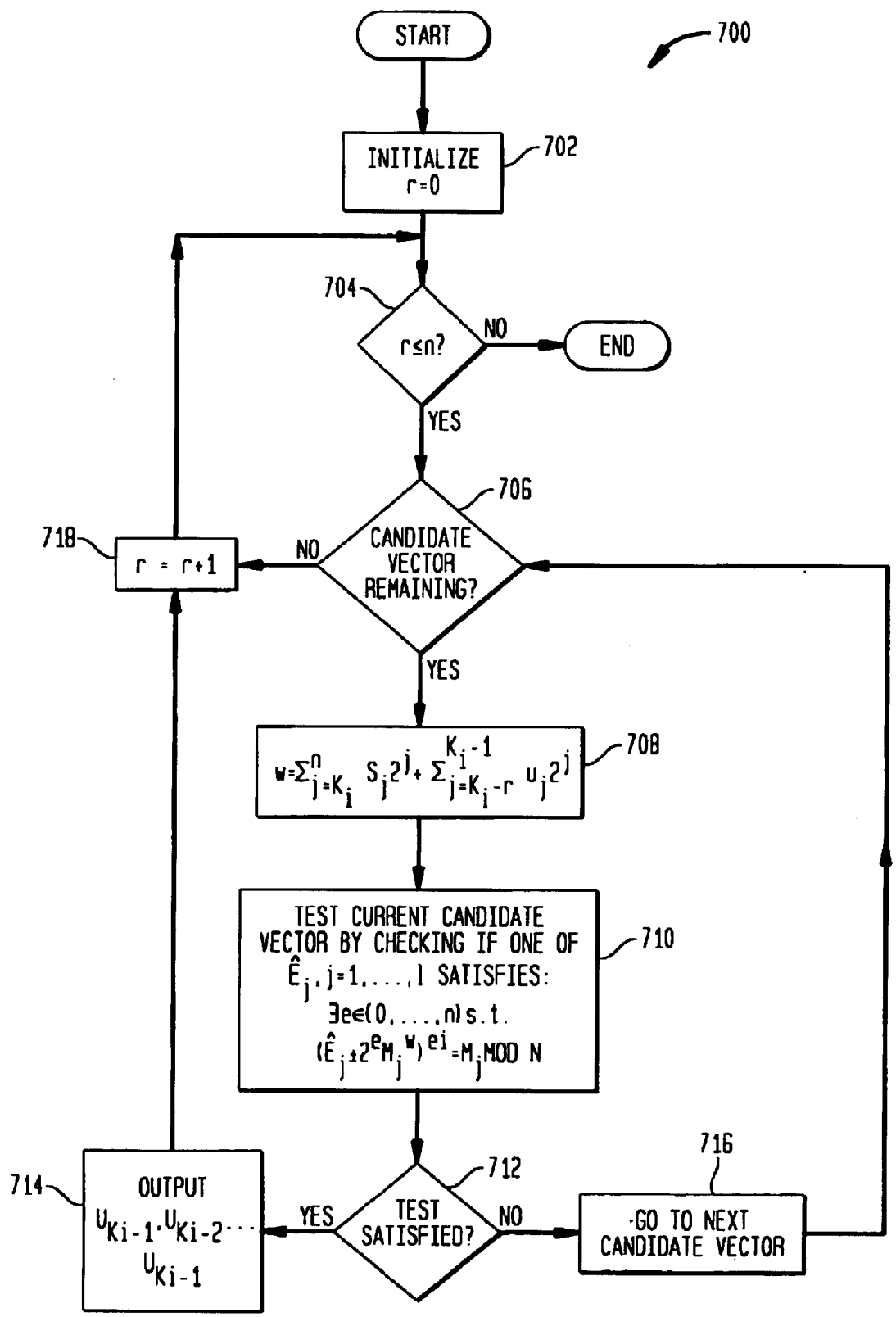
FIG. 7 is a flow chart of an inventive method used with the methods of FIGS. 6A and 6B.

The method illustrated in FIG. 7 may also be used to crack ElGamal's public key cryptosystem. In ElGamal's public key cryptosystem, party i selects a secret exponent $s_i$, and publishes the public key $y = g^{si} \mod p$, where p is an n-bit prime number. To send a message m to party i, party j's device selects a random number b and sends to party i two values $E_1 = y^b$ m mod p and $E_2 = g^b$ mod p. Party i decrypts the message by computing $E_1/E_2^{si} \mod p$; that is:

$$m = \frac{g^{sb} m \pmod{p}^2}{g^{sb} \mod p \mod p} \quad (24)$$

Assume party i uses a smart card 200 for decryption. The smart card contains in a register 206 the secret exponent $s_i$ and will output the plain text message. The attack on the RSA implementation discussed above permits the extraction of the secret exponent $s_i$ from the smart card.

IV. Providing Cryptosystems and Cryptography Devices which Resist Tampering Due to Hardware Faults In addition to the attacks described above, it is believed that hardware fault based attacks may be performed on the following cryptosystems:

1. DES;
2. IDEA;
3. RC5;
4. FEAL; and
5. Skipjack.

These are secret (or symmetric) key systems, not public key systems. Nevertheless, hardware based faults may permit these systems to be cracked.

Regardless of whether a cryptosystem is a public or private key system, vulnerability to a fault-based attack results in a cryptosystem which has questionable security, regardless of whether the fault is generated by machine imperfection, software bugs, intentionally induced faults, or faults planted at the chip level during design and/or manufacturing.

The Secure Electronic Transmission (SET) standard for on-line Internet bank card transactions address faulty computations. The standard provides that if a received message fails an authentication test, an error message is returned. Thus, erroneous security data is not expected, but acknowledged. This acknowledgement is available to eavesdroppers. Ideally, an assurance of zero faulty computation is the best protection. However, as discussed above, it is well-accepted that no computing system is entirely error-free. As a result, verifying cryptographic computations before outputting results is preferred.

A simple way to avoid cracking due to hardware faults is to check the output of a computation before releasing it. This may require recomputing functions, which may sometimes result in an expensive or time consuming process which may be unacceptable.

Authentication schemes may be attacked based on register faults in the internal memory of a cryptography device. Protection against such an attack may include (1) detecting the fault; and (2) correcting the fault. Because a register fault changes the stored data, the device may have computed the (temporarily incorrect) data correctly. This recomputing the data may not reveal an error. In multi-round authentication schemes such as Fiat-Shamir, for example, error detection/correction bits, such as CRC bits, may be added to protect the validity of the stored data.

Signature schemes may be attacked based on a fault during the computation of the signature.. One way to overcome this attack is to verify the signature before outputting it. The device generating the signature may, for example, apply the signature verification algorithm on the signature before transmission. For example, this may be done in RSA signatures by applying the public key to the signature. A second way to overcome this attack is to pad the signed message with random bits. This may prevent an adversary from obtaining two copies of an identical message.

An alternative approach to protecting RSA computations which do not use the Chinese Remainder Theorem is the use of blinding. To compute $x^s$ mod N, the cryptography device first picks a random number r and computes $y=r^e$ mod N, where e is the public exponent: The device computes $(xy)^s/r$ mod N. The result is $x^s$ mod N.

These attacks may be used in the design and testing of existing and future cryptosystems and cryptography devices. Although future cryptography devices may have the same overall structure as seen in FIGS. 1A and 2, such devices should preferably be modified to be impervious to hardware-fault based attacks. One way to design such a device may be to implement one of the software solutions described above. Another way to design such a device is protect the device's internal storage from extreme environments by providing shielding or other hardware solutions..

A cryptography device may be verified to be impervious to a hardware fault-based attack by subjecting the device to one or more of the attacks described above. The cryptography device may be verified to be secure against these attacks by verifying that an adversary cannot determine secret information stored in the cryptography device.

V. Conclusion

Methods for cracking public key cryptosystems are described wherein an erroneous calculation is used to infer secret information. The inventive method is a creative use of a cryptosystem device's miscalculations. Because it is believed that all computers are prone to error, even cryptosystem servers stored in a secure environment are not protected from the inventive method of testing public key cryptosystems.

The inventive methods are particularly useful to security experts and cryptosystem designers. Existing and proposed cryptosystems and cryptography devices should be impervious-to the attacks described. If not, the system or device should be modified or discarded. Smart cards, for example, should now not only conceal their inner circuitry (to avoid revealing its secret key), but also be fault resistant and/or check computed values before transmission, to avoid revealing secret information.

The above described embodiments of the invention are intended to be illustrative only. Numerous alternative embodiments may be devised by those skilled in the art without departing from the spirit and scope of the following claims.

We claim:

1. A method for determining secret information contained in a first cryptography device using a second cryptography device, the method comprising the steps of:
   a. generating an electrical signal comprising a stream of bits containing a correct digital signature in said first cryptography device;
   b. transmitting the electrical signal containing the correct digital signature to said second cryptography device;
   c. placing said first cryptography device under physical stress and in response to the physical stress, generating an electrical signal comprising a stream of bits containing an incorrect digital signature in said first cryptography device;
   d. transmitting the electrical signal containing the incorrect digital signature to said second cryptography device;
   e. in a processor in said second cryptographic device, determining secret information q stored in said first cryptography device using:

$$gcd(E-\hat{E},N)=q$$

wherein N is a product of prime numbers, and one of the prime numbers is q; and
   f. generating an output electrical signal comprising a stream of bits containing the secret information used to generate the correct signature.

2. The method of claim 1 wherein said first cryptographic device generates a digital signature which may be separated into linear components.

3. The method of claim 1 wherein placing said first cryptography device under physical stress includes at least one of applying atypical voltage levels, applying a higher speed than said first cryptography device was designed to accommodate, or applying radiation.

4. A method for determining secret information contained in a first cryptography device using a second cryptography device, the method comprising the steps of:
   a. in said first cryptography device, generating an electrical signal comprising a stream of bits containing a first authentication value of form $r^2$ mod N wherein r is a random number and N is a secret value which is a product of prime numbers and transmitting said electrical signal containing the authentication value to said second cryptography device;
   b. in said second cryptography device, generating an electrical signal comprising a stream of bits containing a subset of integers S and transmitting said electrical signal containing the subset of integers to said first cryptography device;

c. in response to receipt of the electrical signal containing the subset of integers, generating in said first cryptography device an electrical signal comprising a stream of bits containing a second authentication value of form $\hat{y}=(r+\acute{E})\Pi_{i \in s}s_i$ wherein $\hat{y}$ is erroneous value, $s_i$ is a secret exponent used to encrypt, and $\acute{E}$ is a value added to r due to an error and transmitting said second authentication value to said second cryptography device;

d. in response to receipt of the electrical signal containing the second authentication value determining in a processor of said second cryptography device a value for $\acute{E}$ by computing:

$$\left(r+\acute{E}\right)^2 = \frac{\hat{y}^2}{\Pi_{i \in s}v_i} (\text{mod } N)$$

wherein $v_i = s_i^2$;

f. determining in the processor of said second cryptography device a value of r by computing:

$$(r+\acute{E})^2 - r^2 = 2\acute{E}r + \acute{E}^2 (\text{mod } N);$$

g. in response to the calculated values of $\acute{E}$ and r, determining in the processor of said second cryptography device a value for $s_i$ by computing:

$$\Pi_{i \in s}s_i = \frac{\hat{y}}{r + \acute{E}} (\text{mod } N); \text{ and}$$

h. generating an output electrical signal comprising a stream of bits containing secret information $\Pi_{i \in s}s_i$.

5. The method of claim 4 wherein the stop of determining $s_i$ further includes the step of computing in the processor in said second cryptography device:

$$\Pi_{i \in s}s_i = \frac{2\acute{E}\hat{y}}{\frac{\hat{y}^2}{\Pi_{i \in s}v_i} - r^2 + \acute{E}^2} (\text{mod } N).$$

6. The method of claim 4 further comprising the step of determining in the processor in said second cryptography device whether the value of $\acute{E}$ satisfies the relation $(y')=(r')^2T^2$ by using the subset of integers S; wherein T is a guessed value for $\Pi_{i \in s}s_i$.

7. The method of claim 4 wherein the step of generating the electrical signal comprising a subset of integers S in said second cryptography device includes generating a plurality of subsets of S.

8. The method of claim 7 wherein the step of generating in said first cryptography device an electrical signal comprising a second authentication value in response to receipt of the signal containing the plurality of subset of S further includes generating a second authentication value for each subset S of the plurality of subsets S received.

9. The method of claim 8 wherein the step of generating a plurality of subsets S in said second cryptography device further comprises generating singleton sets.

10. A method for determining secret information contained in a first cryptography device using a second cryptography device, the method comprising the steps of:

a. placing said first cryptography device under physical stress and in response to the physical stress, generating an electrical signal comprising a stream of bits containing an incorrect digital signature in said first cryptography device;

b. transmitting the electrical signal containing the incorrect digital signature to said second cryptography device;

c. in response to receipt of the electrical signal containing the incorrect digital signature, selecting a block length in a processor of said second cryptography device;

d. determining in the processor of said second cryptography device a candidate vector w that matches all known bits of the secret information and is zero elsewhere by computing:

$$w = \sum_{y+k_i}^{n} s_j 2^j + \sum_{j=k_i-r}^{k_j-1} u_j 2^j$$

wherein $k_i$ is a time at which an error may have occurred; $s_j$ is a bit which may be incorrect; r is a possible blocklength; and u is a bit which may be incorrect;

e. determining in the processor of said second cryptography device whether candidate vector w is correct by computing:

$$\exists e \in \{0, \ldots n\} s.t. (\acute{E}_j \pm 2^e m_j^w)^{ei} = m_j (\text{mod } N)$$

wherein e=a public exponent;
n=a number of bits in the secret information;
$m_j$=a message;
$e_j$=a public signature verification exponent; and
N=a product of prime numbers;

f. if the candidate vector w is correct, generating an output electrical signal comprising a stream of bits containing a value for the selected block length; and g. if the candidate vector w is incorrect, determining in the processor of said second cryptography device another candidate vector.

11. The method of claim 10 wherein the steps (c)–(f) are performed for a plurality of block lengths.

12. A method for determining secret information contained in a first cryptography device using a second cryptography device, the method comprising the steps of:

a. generating in said second cryptography device an electrical signal comprising a stream of bits containing a challenge t and transmitting the electrical signal containing the challenge to said first cryptography device;

b. in response to receipt of the electrical signal containing the challenge t, generating in said first cryptography device an electrical signal comprising a stream of bits containing a response of form u=r+is mod p, wherein:
r is a random number selected by the first cryptography device;
s is the first cryptography device's secret key; and
p is a large prime number;

c. transmitting the electrical signal containing a response to said second cryptography device;

d. transmitting the electrical signal containing the sane challenge t to said first cryptography device;

e. in response to receipt of the electrical signal containing the challenge t, generating in said first cryptography device an electrical signal comprising a stream of bits containing a second response of form $\hat{u}=\hat{r}+x$ mod p, wherein:

$\hat{r}$ is an erroneous value of r and x is ts mod p;
f. in response to receipt of electrical signal containing the second response, determining in said second cryptography device a location of the error; and
g. generating an output electrical signal comprising a stream of bits containing the secret integer $s_i$.

13. The method of claim 12 wherein the step of determining the location of the error further comprises the steps of trying all possible locations of the error.

* * * * *